Dec. 4, 1956 R. L. CAMPBELL ET AL 2,773,160
WINDOW ANTI-ICING DEVICES
Filed Jan. 11, 1954
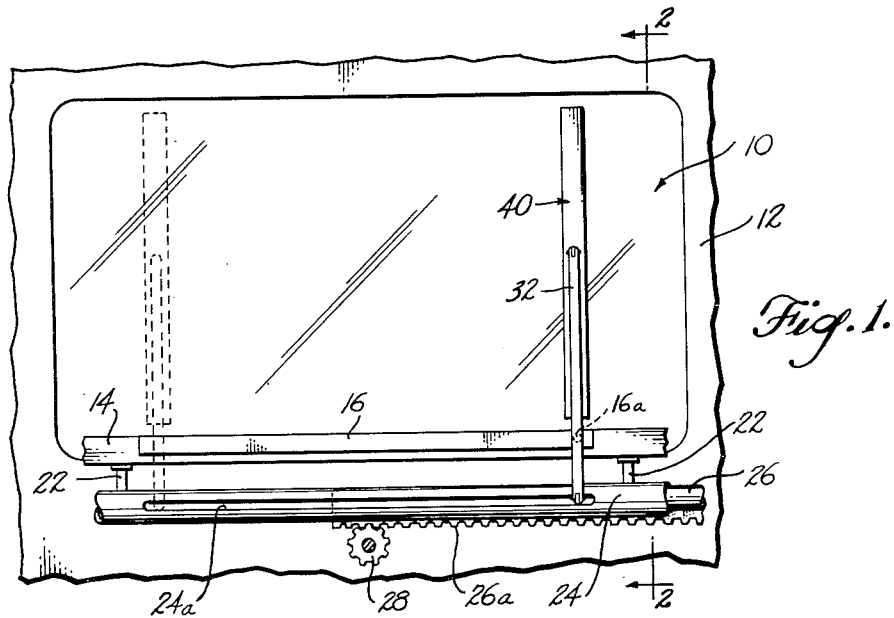
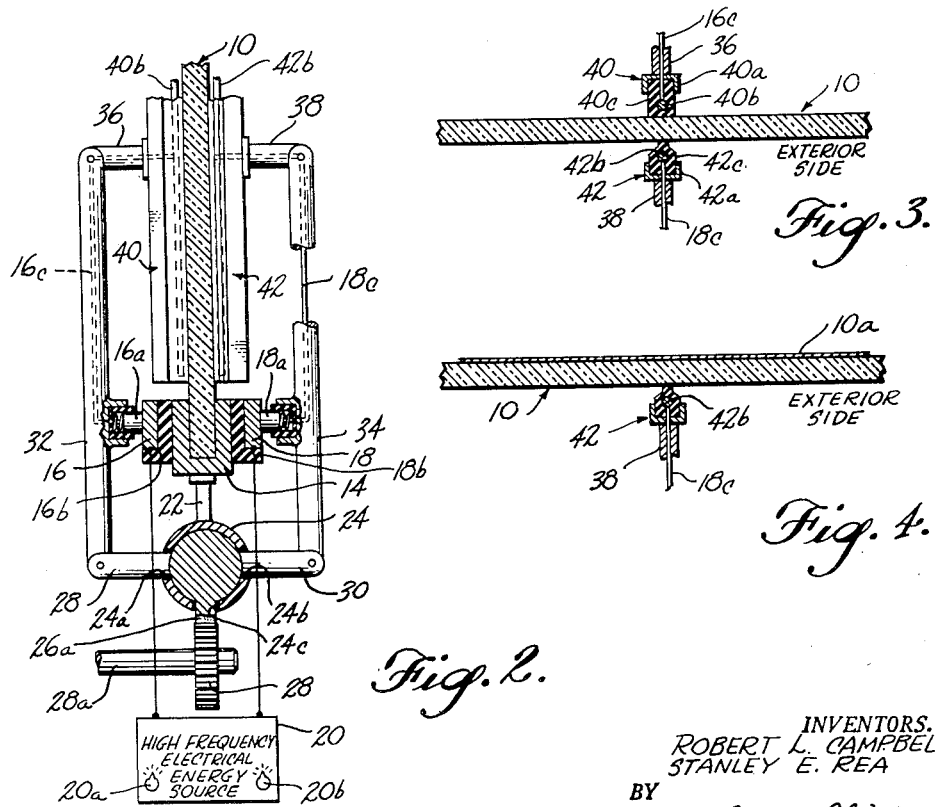
INVENTORS.
ROBERT L. CAMPBELL
STANLEY E. REA
BY
Reynolds, Banks & Christensen
ATTORNEYS

United States Patent Office 2,773,160
Patented Dec. 4, 1956

2,773,160

WINDOW ANTI-ICING DEVICES

Robert L. Campbell, Seattle, and Stanley E. Rea, near Kent, Wash., assignors to Boeing Airplane Company, Seattle, Wash., a corporation of Delaware Application January 11, 1954, Serial No. 403,244

4 Claims. (Cl. 219—10.73)

This invention relates to a novel apparatus for preventing formation of ice on airplane windows and the like, and in general provides for the heating of a window for such purposes without appreciably obstructing visibility through the glass or other transparent material used. The term "window" is herein used in the broad sense of connoting a plate or sheet of material having transparency to electromagnetic or other radiant energy. The invention is herein illustratively described in its presently preferred form as applied to the anti-icing of a vehicle window, such as in an airplane, but it should be understood that certain modifications and changes therein may be made without departing from the inventive concepts involved.

The concept of passing a high frequency electric field through a dielectric window, with the frequency and voltage gradient of the field sufficient to heat the window material to anti-icing temperature is disclosed in the copending application of Roy V. Ostling, Serial No. 399,434 filed December 21, 1953. The present invention is based on that concept, and its general object is to provide novel dielectric heating apparatus for the deicing of windows which is capable of operating effectively under very adverse icing conditions.

Another object is an improved window deicing apparatus which incorporates means for simultaneously wiping the exterior face of the window while the same is being heated to anti-icing temperatures. In this connection the invention provides for the removal of snow and ice accumulations more quickly than might be accomplished merely by heating of the window.

In accordance with the invention a wiper blade, or combination wiper and scraper blade, is mounted in contact with the exterior face of the window, and is moved transversely of its length across a selected area thereof generally in the manner of a windshield swipe; however, in this case the wiper comprises or carries an electrical conductor extending throughout its length, which conductor is connected to one terminal of a high frequency electrical energy source. Positioned on the opposite face of the window is a second electrical conductor which is connected to the opposite terminal of the energy source. In the preferred form as hereinafter disclosed this second electrical conductor comprises an elongated wiper positioned directly opposite the first wiper and mechanically driven to move back and forth across the window area in synchronism therewith. As a result, dielectric lines of force terminating on the first wiper are concentrated in the window material between such wiper and the opposing conductor and are swept back and forth across the breadth of the window area so as to heat the glass or other window material used. By properly selecting and controlling the operating frequency and voltage of the high frequency energy source the window temperature may be raised and maintained in this manner at a desired value preventing ice formation thereon. Moreover, should ice have accumulated on the exterior surface prior to placing the device in operation the removal of such ice is accelerated by the mechanical scraping action of the wiper in conjunction with its dielectric heating function.

It will be noted that the heating which takes place beneath the moving wiper electrode is not superficial, but occurs through the entire thickness of the window. Consequently, a considerable proportion of the heat supplied to any given local area or zone on each pass of the reciprocating electrode is stored so that it is added to the heat injection on the next succeeding pass of the electrode. Thus it is not necessary to create very high temperatures instantaneously beneath the moving electrode in order to produce a constant average temperature which is sufficient for anti-icing purposes, and when this steady-state average temperature condition is reached the differential between the average temperature and the instantaneous temperature existing beneath the moving electrode will be relatively small. Such is not the case in a type of mechanism in which heat is applied only to the surface of a window by a moving element from which the heat is transferred by conduction, since there the opportunity for storage of heat between successive passes of the heating element would be greatly lessened by convection cooling of the window material.

A further aspect of the improved device resides in the fact that it may readily be produced in a form such that a certain amount of dielectric heating also takes place in the moving external electrode itself. As a result not only is the formation of ice prevented on the window, but accumulations of ice (and snow) on the moving external wiper electrode are effectively prevented.

These and other features, objects and advantages of the invention, including certain details of the presently preferred form thereof will become more fully evident from the following description by reference to the accompanying drawings.

Figure 1 is a front view of a vehicle window and associated anti-icing apparatus incorporating the invention.

Figure 2 is a transverse sectional view taken on line 2—2 in Figure 1.

Figure 3 is a longitudinal sectional view taken on line 3—3 in Figure 2.

Figure 4 is a view similar to Figure 3 of a modified form.

In the example the window 10 is assumed to be a rectangular pane of glass mounted in a suitable frame 12 comprising part of a vehicle such as an airplane. The lower edge of this pane is carried in a U-shaped retainer 14 on opposite sides of which extend the respective bus bars 16 and 18 insulated therefrom and from each other by the insulating mounting brackets 16a and 18a, respectively. The bus bar 16 is connected to one terminal of the high frequency electrical energy source 20 and the bus bar 18 is conected to the opposite terminal of said source. The energy source is of any suitable type and preferably includes means for adjusting the operating frequency controlled by adjusting element 20a and means for adjusting the operating voltage controlled by the adjusting element 20b. The conductors 16 and 18 extend the full length of the window area which is to be heated for anti-icing purposes.

Beneath the window frame channel 14 is mounted, on supports 22 a guide tube 24 having longitudinal side slots 24a and 24b and a longitudinal bottom slot 24c. A slide rod 26 is received in the guide tube 24 for longitudinal sliding movement therein, the lower side of this rod carrying a gear rack 26a projecting through the bottom slot 24c for engagement by the stationarily mounted drive pinion 28 by which longitudinal reciprocative movement of the slide rod 26 is effectuated. Rigid arms 28 and 30 project oppositely from corresponding locations on opposite sides of the slide rod 26 and through the tube slots 24a and 24b, respectively. These arms serve as supports of the upright arms 28 and 34 whose lower ends are pivotally connected thereto, respectively, with associated resilient means (not shown) urging the arms 32 and 34 toward each other. The upper ends of the arms 32 and 34 in turn are pivotally connected to the stub supports 36 and 38 for the elongated wipers 40 and 42, respectively. The wipers are thus maintained in corresponding positions extending vertically on opposite sides of the windowpane 10, with the inner edges of the wipers maintained in contact with respectively opposite sides of the glass.

The wiper 40 comprises an elongated and relatively narrow channel 40a upon the back side of which the supporting stub 36 is rigidly mounted, whereas the wiper 42 comprises a similar channel 42a carried by the supporting stub 38. The channels 40a and 42a are of a length sufficient to span the vertical width of the window area to be heated for anti-icing purposes. The channel 40a serves as a support for the elongated conductor 40b extending the full length of the channel and mounted therein by a strip of insulating material 40c. A similar conductor 42b is supported by the channel 42a and is embedded in an insulating strip 42c. The conductors 40b and 42b are thus positioned closely adjacent the respective opposite sides of the windowpane 10 whereby application of voltage to these conductors produces an electric field between them which passes through the thickness of the windowpane. Preferably the insulating strip 42c supporting conductor 42b, which is assumed to be in contact with the exterior face of the window 10, is formed as a scraper so that in moving back and forth across the window the wiper 42 will act as a window swipe and ice scraper.

Energizing voltage for electrode conductor 40b is derived from bus bar conductor 16 by means of a sliding brush contact 16a carried by the vertical arm 32, in a position to slide lengthwise against the outer face of the conductor 16 as the arm 32 is reciprocated back and forth across the horizontal width of the window area. The brush 16a is connected by an insulated conductor 16c to the electrode conductor 40b. A similar slide brush 18a bears against the outer face of bus bar conductor 18, being supported by the arm 34. An electrical conductor 18c connects the brush 18a to the electrode conductor 42b, as illustrated.

It will be evident that rotation of pinion shaft 28a a predetermined number of revolutions, first in one direction and then in the other, effects longitudinal reciprocation of the slide rod 26 in the guide tube 24 and thereby causes the opposing wipers 40 and 42 to reciprocate back and forth across the horizontal width of the window area to be heated for anti-icing purposes. As the wipers reciprocate in this manner, the continuous application of high frequency voltage to the electrode conductors 40b and 42b produces a localized dielectric heating effect in the window material lying generally between them, so that each incremental vertical strip or zone of the window receives intermittent applications of heat by dielectric losses therein. Since the heating effect taking place in the glass or other window material occurs throughout the thickness of the window panel with this type of heating, and since most dielectric materials capable of serving as windows having comparatively good heat storage capacity, a steady-state condition will be reached in which the average temperature of any given area being swept by the electrodes will remain substantially constant and will not differ greatly from the maximum temperature existing directly between the heating electrodes. In other words, in order to maintain a relatively high effective average temperature of the window panel for anti-icing and defrosting purposes, it will not be necessary to subject the glass to unduly high local temperatures beneath the moving elements which produce the heating effect. As a result there is no reasonable likelihood that the glass will be stressed excessively and tend to crack as a result of sharp temperature differentials.

It should also be noted that the lines of force of an electric field existing between two parallel conductors do not confine themselves entirely in the region lying directly between the conductors. On the contrary, there is a fringe or stray field which is particularly large in proportion to the direct field component in the case of conductors which are relatively small in cross section, as in the preferred instance herein disclosed. Thus the heating effect is not confined entirely in the region lying directly between the conductors 40b and 42b, but spreads out over adjoining areas on either side of the common plane of these conductors. This fringing effect works to advantage since it prolongs the intermittent heating periods which take place during movement of the wipers and thereby makes possible the use of lower operating frequency and voltage in the energy source 20 than might otherwise be required in order to produce the desired average temperature in the windowpane 10.

It will also be noted that in the illustrated embodiment (Figure 3) the wipers themselves will receive a certain amount of heat by conduction from the sides of the windowpane being contacted. There will also be a certain amount of dielectric heating of the insulating supports 40c and 42c due to dielectric losses occurring in these supports as a result of the passage of high frequency field through them in extending between the conductors 40b and 42b. This is also advantageous in that the heating of the wipers, especially the wiper contacting the exterior side of the window, tends to prevent accumulations of ice or snow on the wiper itself which would obstruct visibility through the window.

The insulating support 42c for the conductor 42b is preferably formed of a relatively hard dielectric material which will permit it to function as an ice scraper. For this same purpose the edge of this dielectric strip is made relatively narrow so that the unit area contact pressure will be relatively high. If desired, of course, the conductor 42b could be formed so as to contact the window surface directly. This could also be done in the case of conductor 40b. In any event, it is preferred that the conductors 40b, 42b be located as closely as possible to the window surfaces so as to produce a maximum voltage gradient across the thickness of the window panel for a given applied electrode voltage. The dielectric heating effect is proportional to the product of the frequency and the square of the voltage gradient. If desired, a suitable temperature sensing element may be incorporated in the heated area of the window as a means of regulating the operating voltage or frequency of the energy source 20 and thereby regulating the average window temperature at a desired value for anti-icing purposes.

In Figure 4 a variation is illustrated in which a single wiper element is employed. Preferably this wiper element is similar to the element 42 in the preceding form and is mounted to sweep across the exterior face of the window 10. In this modification the opposite conductor, cooperating with the wiper conductor 42b in producing the dielectric heating effect in the window panel is stationary and comprises a thin electrically conductive coating 10a deposited on the interior face of the glass. A suitable conductive coating which will be transparent and will not impair visibility through the window is represented in the product of the Libby-Owens-Ford Glass Company, referred to in the trade as "Electrapane," or in the product of the Pittsburg Plate Glass Company referred to as "Nesa." Alternatively, the process disclosed in patent No. 2,429,420, October 21, 1947, McMaster, may be used to form a conductively coated glass panel suitable for present purposes. An advantage of the modified construction shown in Figure 4 is the simplification of mechanism resulting when it is necessary to mount a movable wiper element only on one side of the window panel. The dielectric heating action taking place in this form, however, will be substantially similar to that occurring in the form previously described.

These and other variations will be evident to those skilled in the art.

We claim as our invention:

1. A window anti-icing device comprising, in combination with a window of dielectric material, an elongated narrow electrical conductor of a length to span across one dimension of a window area to be heated for anti-icing purposes, means mounting said conductor closely adjacent and parallel to one window surface with the length of said conductor extending across said window area as aforementioned, means for moving said conductor reciprocatively generally transversely of its length back and forth across said area, a second electrical conductor, said second electrical conductor being positioned closely adjacent said window in spaced generally parallel relation to said first conductor whereby application of high frequency voltage to said conductors produces an electric field therebetween passing through the window material, and a source of high frequency electrical energy having opposite terminals connected respectively to said conductors and having an operating frequency and output voltage sufficient to heat the window to effective anti-icing temperature during continued reciprocative movement of said first conductor.

2. The window anti-icing device defined in claim 1, wherein the second conductor comprises an elongated relatively narrow conductor mounted on the side of the window opposite from the first conductor and in corresponding position thereon, and means for moving said second conductor synchronously with the first conductor for maintaining a substantially constant positional relationship therebetween.

3. A window anti-icing device comprising, in combination with a window of dielectric material, an elongated relatively narrow window wiper comprising an electrical conductor extending lengthwise thereof and of a length to span across one dimension of a window area to be heated for anti-icing purposes, means mounting said wiper in wiping contact with said window with the length of said wiper extending across said window area as aforementioned, means for moving said wiper reciprocatively generally transversely of its length back and forth across said area, a second electrical conductor, said second electrical conductor being positioned closely adjacent said window in spaced generally parallel relation to said first conductor whereby application of high frequency voltage to said conductors produces a dielectric field therebetween passing through the window material, and a source of high frequency electrical energy having opposite terminals connected respectively to said conductors and having an operating frequency and output voltage sufficient to heat the window to effective anti-icing temperature during continued reciprocative movement of said wiper.

4. The window anti-icing device defined in claim 3, wherein the second conductor comprises an elongated relatively narrow conductor mounted on the side of the window opposite from the wiper and in corresponding position thereon, and means for moving said second conductor synchronously with the wiper for maintaining a substantially constant positional relationship therebetween.

References Cited in the file of this patent

UNITED STATES PATENTS

| | | |
|---|---|---|
| 1,912,214 | Northrup | May 30, 1933 |
| 2,485,659 | Robertson | Oct. 25, 1949 |
| 2,630,519 | Gard | Mar. 3, 1953 |
| 2,667,568 | Ferier | Jan. 26, 1954 |